United States Patent
Aggoune et al.

(10) Patent No.: US 11,358,585 B2
(45) Date of Patent: Jun. 14, 2022

(54) SYSTEM AND METHOD FOR TORQUE SPLIT ARBITRATION

(71) Applicant: DELPHI TECHNOLOGIES IP LIMITED, St. Michael (BB)

(72) Inventors: Karim Aggoune, Auburn Hills, MI (US); Peter M. Olin, Ann Arbor, MI (US); Peter A. Marshall, Oxford, MI (US); Li Tang, Shelby Township, MI (US); Keith A. Confer, Flushing, MI (US); John E. Kirwan, Troy, MI (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 498 days.

(21) Appl. No.: 16/240,640

(22) Filed: Jan. 4, 2019

(65) Prior Publication Data
US 2020/0216058 A1   Jul. 9, 2020

(51) Int. Cl.
  *B60W 20/15* (2016.01)
  *B60W 10/06* (2006.01)
  (Continued)

(52) U.S. Cl.
  CPC ........... *B60W 20/15* (2016.01); *B60W 10/06* (2013.01); *B60W 10/08* (2013.01); *B60W 30/143* (2013.01);
  (Continued)

(58) Field of Classification Search
  CPC ...... B60W 20/15; B60W 10/06; B60W 10/08; B60W 2556/50; B60W 2555/60;
  (Continued)

(56) References Cited

U.S. PATENT DOCUMENTS

| | | | |
|---|---|---|---|
| 5,913,917 A | 6/1999 | Murphy | |
| 5,938,720 A | 8/1999 | Tamai | |

(Continued)

FOREIGN PATENT DOCUMENTS

CN  108909617 A  11/2018

OTHER PUBLICATIONS

George Scora et al., "Value Of Eco-Friendly Route Choice For Heavy-Duty Trucks", Research In Transportation Economics, Oct. 1, 2015, pp. 3-14, vol. 52, College of Engineering—Center for Environmental Research and Technology, University of California at Riverside, 1084 Columbia Ave, Riverside, CA USA.

(Continued)

*Primary Examiner* — James J Lee
*Assistant Examiner* — Shon G Foley
(74) *Attorney, Agent, or Firm* — Dickinson Wright PLLC (57) ABSTRACT

A method for torque split arbitration in a vehicle includes identifying at least one route characteristic of a portion of a route being traversed by the vehicle. The method further includes determining a target torque split based on the at least one route characteristics. The method further includes generating a first output torque demand that corresponds to a product of a first portion of a target torque demand to be provided by a first propulsion unit and a ratio of a total propulsion system torque demand and the target torque demand. The method further includes generating a second output torque demand based on the first output torque demand.

20 Claims, 5 Drawing Sheets

(51) Int. Cl.
*B60W 10/08* (2006.01)
*B60W 30/14* (2006.01)
*G05D 1/02* (2020.01)

(52) U.S. Cl.
CPC ..... *B60W 2552/15* (2020.02); *B60W 2555/60* (2020.02); *B60W 2556/50* (2020.02); *B60Y 2200/92* (2013.01); *G05D 1/021* (2013.01)

(58) Field of Classification Search
CPC ........... B60W 2552/15; B60W 30/143; B60W 2710/0666; B60W 2710/083; B60W 2540/10; B60W 30/16; B60W 20/10; B60W 20/11; B60W 20/12; B60W 10/26; B60W 10/28; B60W 10/18; B60W 20/00; B60W 2520/10; B60W 2710/18; B60Y 2200/92; G05D 1/021; G05D 1/0223; Y02T 90/40; B60L 7/10
See application file for complete search history.

(56) References Cited

U.S. PATENT DOCUMENTS

| | | | |
|---|---|---|---|
| 8,050,856 | B2 | 11/2011 | Duty et al. |
| 8,706,409 | B2 | 4/2014 | Mason et al. |
| 8,849,488 | B2 | 9/2014 | Kleine-Besten et al. |
| 9,081,651 | B2 | 7/2015 | Filev et al. |
| 9,557,746 | B2 | 1/2017 | Nefedov |
| 2010/0299056 | A1 | 11/2010 | Mueller et al. |
| 2011/0035124 | A1 | 2/2011 | Gentile et al. |
| 2011/0238457 | A1 | 9/2011 | Mason et al. |
| 2012/0179365 | A1 | 7/2012 | Miyahara et al. |
| 2014/0277835 | A1 | 9/2014 | Filev et al. |
| 2015/0298574 | A1* | 10/2015 | Bramson ............. B60L 15/2045 701/22 |
| 2016/0144713 | A1 | 5/2016 | Verheijen et al. |
| 2016/0167642 | A1* | 6/2016 | Debert ............. B60W 50/0097 701/22 |
| 2017/0036543 | A1 | 2/2017 | Tschanz |
| 2018/0053409 | A1 | 2/2018 | Li et al. |
| 2018/0058868 | A1* | 3/2018 | Kang .................... B60W 20/12 |
| 2018/0201250 | A1 | 7/2018 | D'Amato et al. |
| 2018/0290645 | A1 | 10/2018 | Zhao et al. |
| 2019/0164451 | A1 | 5/2019 | Gaither et al. |
| 2019/0217704 | A1 | 7/2019 | Tschanz |
| 2019/0263413 | A1* | 8/2019 | Hancock ................. B60K 1/02 |
| 2020/0062126 | A1 | 2/2020 | Duan et al. |
| 2021/0191410 | A1* | 6/2021 | Ghosh ................. G05D 1/0088 |

OTHER PUBLICATIONS

Megan Treacy, EcoSpeed App Directs Your Driving, Cuts Fuel Use by 30%, https://www.treehugger.com/gadgets/ecospeed-app-directs-your-driving-cuts-fuel-use-30.html, Feb. 20, 2012.

Duncan Graham-Rowe, A More Fuel-Efficient Route Planner, https://www.technologyreview.com/s/419370/a-more-fuel-efficient-route-planner/, Jun. 15, 2010.

* cited by examiner

SYSTEM AND METHOD FOR TORQUE SPLIT ARBITRATION

GOVERNMENT LICENSE RIGHTS

This invention was made with government support under the DE-AR0000794 contract awarded by United States Department of Energy, Advanced Research Projects Agency (ARPA-E). The government has certain rights in the invention.

TECHNICAL FIELD

This disclosure relates to vehicle propulsion control, and in particular to systems and methods for improving vehicle energy efficiency using torque split arbitration.

BACKGROUND

Vehicles, such as cars, trucks, sport utility vehicles, crossovers, mini-vans, or other suitable vehicles, include a powertrain system that includes, for example, a propulsion unit, a transmission, drive shafts, wheels, and other suitable components. The propulsion unit may include an internal combustion engine, a fuel cell, one or more electric motors, and the like. A hybrid vehicle may include a powertrain system comprising more than one propulsion unit. For example, a hybrid vehicle may include an internal combustion engine and an electric motor that cooperatively operate to propel the vehicle.

Typically, in hybrid vehicles, a propulsion control module (PCM) may be configured to control an instantaneous torque from the available propulsion units in order to achieve a desired vehicle speed. For example, the PCM may divide a total torque demand (e.g., torque demanded of the propulsion units to achieve a desired vehicle speed) between the propulsion units, such that, the propulsion units cooperatively operate to achieve the desired vehicle speed (e.g., by the PCM demanding a portion of the total toque demand of one propulsion unit and the remainder of the total torque demand of the other propulsion unit.). The instantaneous total toque demand comes from the driver, either through the driver pedals, or from settings of a vehicle speed control system such as an Adaptive Cruise Control (ACC) module.

SUMMARY

This disclosure relates generally to vehicle propulsion control systems and methods.

An aspect of the disclosed embodiments is a method for torque split arbitration in a vehicle. The method includes identifying at least one route characteristic of a portion of a route being traversed by the vehicle. The method further includes determining a target torque demand and a target torque split based on the at least one route characteristic and a vehicle energy consumption profile. The target torque split indicates a first portion of the target torque demand to be provided by a first propulsion unit and a second portion of the target torque demand to be provided by a second propulsion unit. The method further includes receiving a total propulsion system torque demand from a vehicle propulsion controller of the vehicle. The method further includes generating a first output torque demand that corresponds to a product of the first portion of the target torque demand to be provided by the first propulsion unit and a ratio of the total propulsion system torque demand and the target torque demand. The method further includes generating a second output torque demand that corresponds to the difference of the total propulsion system torque demand and the first output torque demand. The method further includes communicating the first output torque demand and the second output torque demand to a torque split controller of the vehicle.

Another aspect of the disclosed embodiments is an apparatus for torque split arbitration in a vehicle that includes a memory and a processor. The memory includes instructions executable by the processor to: identify at least one route characteristic of a portion of a route being traversed by the vehicle; determine a target torque demand and a target torque split based on the at least one route characteristic and a vehicle energy consumption profile, wherein the target torque split indicates a first portion of the target torque demand to be provided by a first propulsion unit and a second portion of the target torque demand to be provided by a second propulsion unit; receive a total propulsion system torque demand from a vehicle propulsion controller of the vehicle; generate a first output torque demand that corresponds to a product of the first portion of the target torque demand to be provided by the first propulsion unit and a ratio of the total propulsion system torque demand and the target torque demand; generating a second output torque demand that corresponds to the difference of the total propulsion system torque demand and the first output torque demand; and communicating the first output torque demand and the second output torque demand to a torque split controller of the vehicle.

Another aspect of the disclosed embodiments is on a non-transitory computer-readable storage medium that includes executable instructions that, when executed by a processor, facilitate performance of operations, comprising: identifying at least one route characteristic of a portion of a route being traversed by a vehicle; determining a target torque demand and a target toque split based on the at least one route characteristic and a vehicle energy consumption profile, wherein the target torque split indicates a first portion of the target torque demand to be provided by an electric motor and a second portion of the target torque demand to be provided by an internal combustion engine; receiving a total propulsion system torque demand from a vehicle propulsion controller of the vehicle; generating a first output torque demand that corresponds to a product of the first portion of the target torque demand to be provided by the electric motor and a ratio of the total propulsion system torque demand and the target torque demand; generating a second output torque demand that corresponds to the difference of the total propulsion system torque demand and the first output torque demand; and communicating the first output torque demand and the second output torque demand to a torque split controller of the vehicle.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Vehicles, such as cars, trucks, sport utility vehicles, crossovers, mini-vans, or other suitable vehicles, include a power train system that includes, for example, a propulsion unit, a transmission, drive shafts, wheels, and other suitable components. The propulsion unit may include an internal combustion engine, a fuel cell, one or more electric motors, and the like. A hybrid vehicle may include a powertrain system comprising more than one propulsion unit. For example, a hybrid vehicle may include an internal combustion engine and an electric motor that cooperatively operate to propel the vehicle.

Typically, in hybrid vehicles, a propulsion control module (PCM) may be configured to control an instantaneous torque from the available propulsion units in order to achieve a desired vehicle speed. For example, the PCM may divide a total torque demand (e.g., torque demanded of the propulsion units to achieve a desired vehicle speed) between the propulsion units, such that, the propulsion units cooperatively operate to achieve the desired vehicle speed (e.g., by the PCM demanding a portion of the total toque demand of one propulsion unit and the remainder of the total torque demand of the other propulsion unit.). The instantaneous total toque demand comes from the driver, either through the driver pedals, or from settings of a vehicle speed control system such as an Adaptive Cruise Control (ACC) module.

While such PCMs are configured to split a demanded torque between the propulsion units of the vehicle, the PCM typically determines how to split the torque demand between the propulsion units based on predetermined energy constraints and the amount of torque each propulsion unit can supply at the time the instantaneous torque is demanded, to achieve the desired vehicle speed. That is, typical PCMs do not consider information, such as vehicle parameters or route characteristics when determining a torque split for a hybrid vehicle. However, such information, when applied to a determination of a torque split, may contribute to reducing energy consumption of the hybrid vehicle. Accordingly, systems and methods, such as those described herein, that determine a torque split using, among other things, vehicle parameters and route characteristics of a route being traversed by the vehicle, may be desirable.

For example, as described a hybrid vehicle may include a first propulsion unit and a second propulsion unit. The first propulsion unit may include one or more electric motors and the second propulsion unit may include an internal combustion engine. If the maximum torque available from the second propulsion unit is greater than the maximum torque available from the first propulsion unit (e.g., in the case of a 48 volt mild hybrid system), then the systems and methods disclosed herein will cause the closest to optimal torque assist from the first propulsion unit to be provided.

Figure 1:
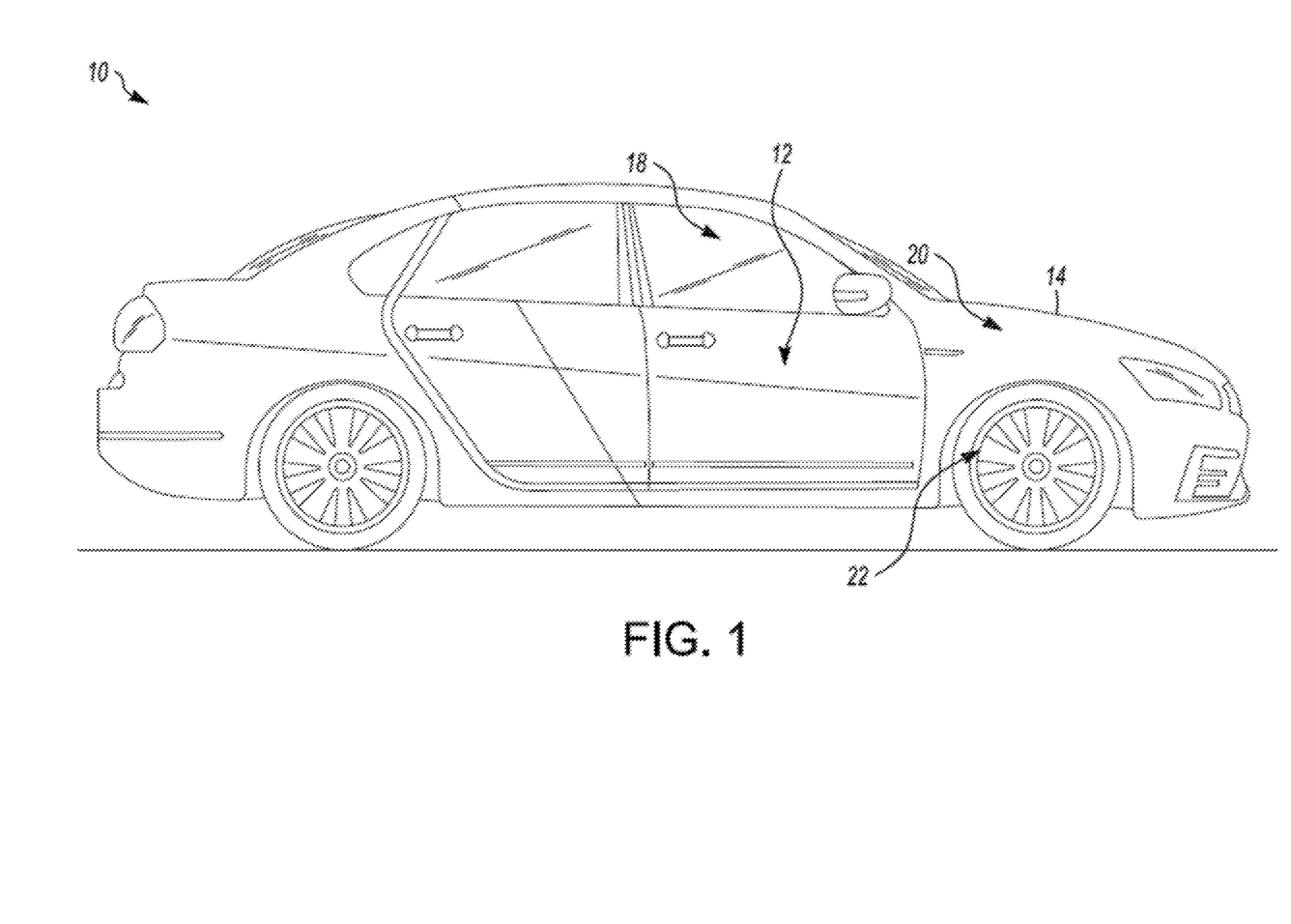
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 may be disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel, clutch, or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force which is translated through the transmission to one or more axles which turns wheels 22. When the vehicle 10 includes one or more electric motors, a vehicle battery, and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control module or mechanism, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
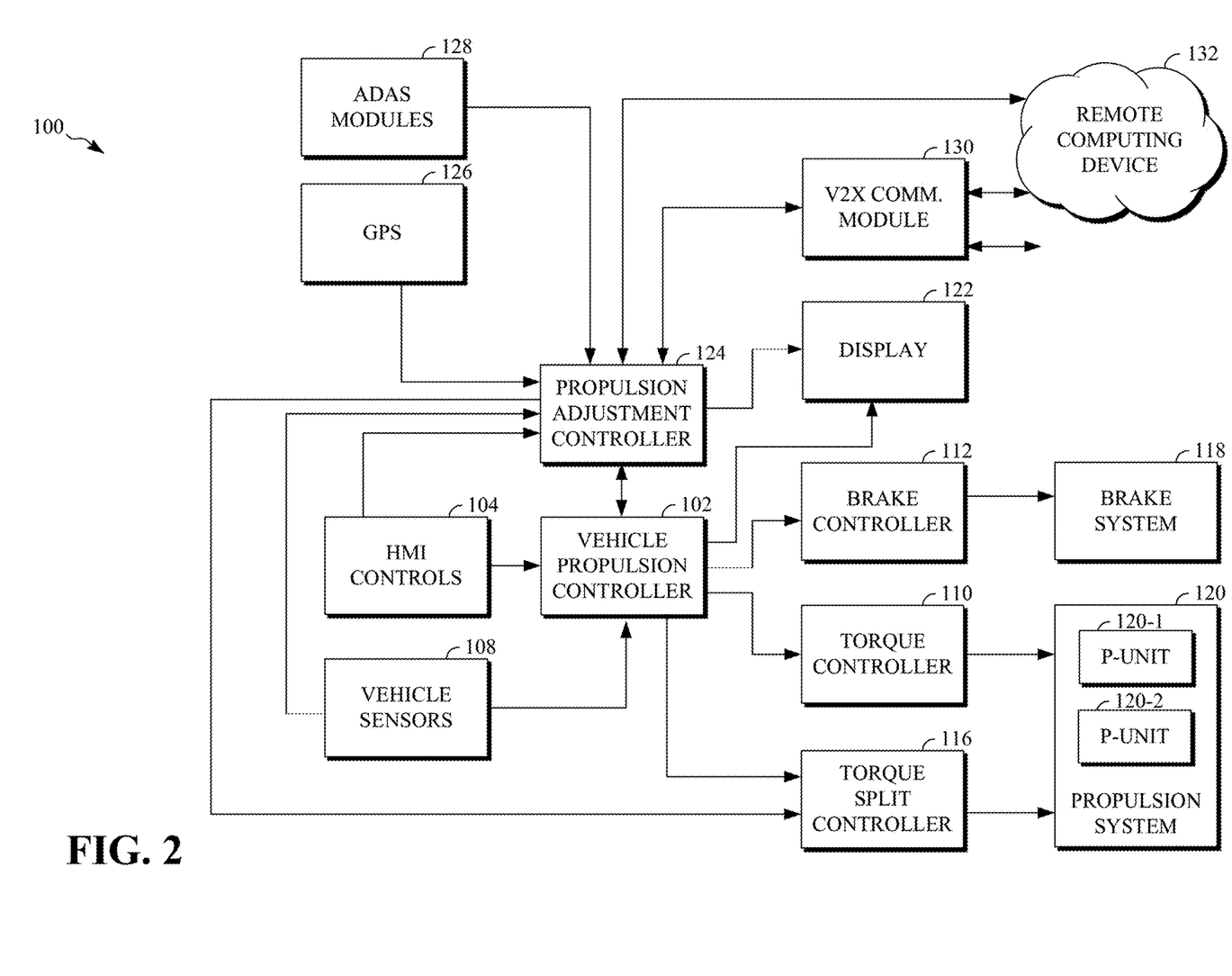
FIG. 2 generally illustrates a block diagram of a vehicle propulsion control system according to the principles of the present disclosure.

FIG. 2 generally illustrates a block diagram of a vehicle propulsion control system 100 according to the principles of the present disclosure. The system 100 may be disposed within a vehicle, such as the vehicle 10. The system 100 is configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiment, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the driver. In some embodiments, the system 100 may include a propulsion adjustment controller (PAC) 124, a global position system (GPS) antenna 126 in communication with a mapping characteristics module (not shown), advanced driver assistance system (ADAS) modules 128, and a vehicle to other systems (V2X) communication module 130. The V2X communication module 130 may be configured to communication with other vehicles, other infrastructure (e.g., such as traffic infrastructure, mobile computing devices, and/or other suitable infrastructure), a remote computing device (e.g., the remote computing device 132), other suitable systems, or a combination thereof.

As will be described, the system 100 may be in communication with one or more remote computing devices 132. In some embodiments, at least some of the components of the system 100 may be disposed in a propulsion control module (PCM) or other onboard vehicle computing device. For example, at least the PAC 124 and the VPC 102 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the components. For example, the PAC 124 may be disposed on a memory and executed by a processor. It should be understood that the system 100 may include any combination of computing devices, either disposed locally in the vehicle 10 and/or disposed remotely, as will be described.

In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. It should be understood that, while only limited components of the system 100 are illustrated, the system 100 may include additional autonomous components or other suitable components.

The VPC 102 is in communication with one or more human to machine interfaces (HMI) 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the driver of the vehicle 10 may interface with the HMI controls 104 to use the VPC 102 to control vehicle propulsion and/or other features of the VPC 102. For example, the driver may actuate an HMI switch of the HMI controls 104 disposed on the steering wheel of the vehicle 10. The HMI controls 104 may communicate a signal to the VPC 102. The signal may indicate a desired vehicle speed selected by the driver. The VPC 102 generates a torque demand corresponding to the desired vehicle speed and communicates the torque demand to a torque controller 110. The torque controller 110 is in communication with the propulsion system 120 and/or other vehicle propulsion systems of the vehicle 10. The torque controller 110 selectively controls the propulsion system 120 and/or the other vehicle propulsion systems using the torque demand to achieve the desired vehicle speed. The driver may increase or decrease the desired vehicle speed by actuating additional switches of the HMI controls 104. The VPC 102 may adjust the torque demand to achieve the increase or decrease in the desired vehicle speed.

The VPC 102 may continuously adjust the torque demand in order to maintain the desired vehicle speed. For example, the VPC 102 may be in communication with the vehicle sensors 108. The vehicle sensors 108 may include cameras, speed sensors, proximity sensors, other suitable sensors as will be described, or a combination thereof. The VPC 102 may receive a signal from the vehicle sensors 108 that indicates a current vehicle speed. The VPC 102 may adjust the torque demand to adjust the vehicle speed when the signal indicates that the current vehicle speed is different from the desired vehicle speed. For example, the vehicle 10 may traverse an incline that causes the vehicle 10 to reduce current vehicle speed (e.g., because the torque demand applied by the torque controller 110 is insufficient to maintain vehicle speed while on the incline). The VPC 102 may increase the torque demand in order adjust the current vehicle speed, thereby achieving the desired vehicle speed.

In some embodiments, such as when the VPC 102 includes an adaptive cruise control mechanism, the VPC 102 may adjust the torque demand based on the proximity of a lead vehicle (e.g., a vehicle immediately in front of the vehicle 10). For example, the VPC 102 may receive information from the vehicle sensors 108 indicating the presence of a lead vehicle. The information may be captured by the vehicle sensors 108 using cameras, proximity sensors, radar, the V2X communication module 130, other suitable sensors or input devices, or a combination thereof. The VPC 102 may determine whether to maintain the desired vehicle speed or increase or decrease the torque demand in order to increase or decrease the current vehicle speed. For example, the driver may indicate, using the HMI controls 104, to maintain pace with the lead vehicle while keeping a safe stopping distance between the vehicle 10 and the lead vehicle. The VPC 102 may selectively increase the torque demand if the lead vehicle is traveling faster than the vehicle 10 and may selectively decrease the torque demand if the lead vehicle is traveling slower relative to the vehicle 10.

The VPC 102 may bring the vehicle 10 to a complete stop when the lead vehicle comes to a complete stop. For example, the VPC 102 may be in communication with the brake controller 112 to send a plurality of signals over a period indicating to the brake controller 112 to control vehicle braking (e.g., the VPC 102 may bring the vehicle to a stop over a period so as not to suddenly stop the vehicle, however, in the case of a sudden stop of the lead vehicle, the VPC 102 brings the vehicle 10 to a sudden stop to avoid collision with the lead vehicle). The brake controller 112 may be in communication with the brake system 118. The brake system 118 may include a plurality of brake components that are actuated in response to the brake controller 112 implementing braking procedures based on the plurality of signals from the VPC 102.

In some embodiments, the VPC 102 may implement engine braking and/or braking via one or more electric motors through a regenerative braking system by adjusting the torque demand to allow the vehicle 10 to come to a stop without use of the brake system 118 or the VPC 102 may use a combination of regenerative braking and the brake system 118 to bring the vehicle 10 to a complete stop. In order to resume vehicle propulsion control, the driver indicates to resume vehicle propulsion control using the HMI controls 104 (e.g., the VPC 102 is not configured to resume vehicle propulsion control without interaction from the driver). In some embodiments, the vehicle 10 may include a higher level of automation including a higher level of propulsion control, as described, and may include suitable controls for bringing the vehicle 10 to a complete stop without interaction with the driver of the vehicle 10.

In some embodiments, the VPC 102 may provide the torque demand to the torque split controller 116. The torque split controller 116 may determine a torque split in order to utilize a first propulsion unit 120-1 and a second propulsion unit 120-2. In some embodiments, the first propulsion unit 120-1 may include an electric motor and the second propulsion unit 120-2 may include an internal combustion engine. It should be understood that while only an internal combustion engine and an electric motor are described, the vehicle 10 may include any hybrid combination of any suitable vehicle engines and motors. The torque split indicates a portion of the torque demand to be applied to the first propulsion unit 120-1 and a portion of the torque demand to be applied to the second propulsion unit 120-2. For example, the electric motor may be used alone for vehicle propulsion when the torque demand is below a threshold. However, the internal combustion engine may provide at least a portion of vehicle propulsion in order to assist the electric motor. The torque split controller 116 is in communication with the propulsion system 120, and accordingly, with the first propulsion unit 120-1 and the second propulsion unit 120-2, to apply the torque split.

In some embodiments, the VPC 102 includes a plurality of safety controls. For example, the VPC 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the VPC 102 to perform one or more safety operations. For example, in the case of a lead vehicle coming to a sudden stop, the safety controls may generate a safety signal, based on proximity information from the vehicle sensors 108, indicating to the VPC 102 to immediately bring the vehicle 10 to a complete stop. In some embodiments, the VPC 102 may determine whether to apply the desired vehicle speed set by the driver using the HMI controls 104 based on the signal from the safety controls. For example, the driver may increase the desired vehicle speed which may bring the vehicle 10 closer to the lead vehicle (e.g., the vehicle 10 would travel faster than the lead vehicle if the desired vehicle speed were achieved). The VPC 102 may determine not to apply the desired vehicle speed, and instead may provide an indication to the display 122 indicating to the driver that increasing the desired vehicle speed may be unsafe or the VPC 102 may ignore the increase in the desired vehicle speed. In some embodiments, the VPC 102 may be in communication with a transmission controller module (TCM). The VPC 102 may receive information from the TCM (e.g., an automatically selected gear) and may determine and/or adjust the total torque demand based on the information received from the TCM.

As described, the system 100 includes a PAC 124. The PAC 124 is configured to determine a profile for a target vehicle speed based on, at least, route information of a route being traversed by the vehicle 10, vehicle parameters of the vehicle 10, information about other vehicles proximate to the vehicle 10, traffic information, weather information, the current vehicle speed, the desired vehicle speed, other information, or a combination thereof. As will be described, the PAC 124 may determine the profile for the target vehicle speed based on an energy consumption profile of the vehicle 10. The energy consumption profile may be generated using the information described above and may indicate an optimum energy consumption of the vehicle 10 for various route characteristics, such as road grades, curvatures, traffic, speed limits, stop signs, traffic signals, other route characteristics, or a combination thereof.

The PAC 124 receives route characteristics (e.g., road grade characteristics, route distance, and route directions), vehicle parameters, traffic characteristics, weather characteristics, vehicle to vehicle parameters, other information or characteristics, or a combination thereof. In some embodiments, the PAC 124 receives at least some of the route characteristics from a mapping characteristics module based on location information from the GPS antenna 126. The mapping characteristics module may be disposed within the vehicle 10 (e.g., within the system 100) or may be disposed on a remote computing device, such as the remote computing device 132. The GPS antenna 126 may capture various global positioning signals from various global positioning satellites or other mechanisms. The GPS antenna 126 may communicate the captured signals to the mapping characteristics module, whether the mapping characteristics module is disposed within the vehicle 10 or on a remote computing device, such as the remote computing device 132. The mapping characteristics module may generate the route characteristics based on the signals received from the GPS antenna 126 and communicate the route characteristics to the PAC 124. For example, the PAC 124 may receive a route distance, route directions, road grade information of the route, other route characteristics, or a combination thereof. In some embodiments, the PAC 124 may receive traffic signal location information, traffic stop sign location information, posted speed limit information, lane shift information, other route characteristics or information, or a combination thereof, from the mapping characteristics module based on location information from the GPS antenna 126.

The PAC 124 may receive further vehicle parameters from the vehicle sensors 108. For example, the vehicle sensors 108 may include an energy level sensor (e.g., a fuel level sensor or a battery charge sensor), an oil sensor, a speed sensor, a weight sensor, other suitable sensors, or a combination thereof. The PAC 124 may receive an energy level of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, other suitable weather information, or a combination thereof, from the vehicle sensors 108.

The PAC 124 may receive at least some of the route characteristics from the ADAS modules 128. The ADAS modules 128 may assist the driver of the vehicle 10 to improve safety. The ADAS modules 128 may be configured to automate and/or adapt and enhance vehicle systems for safety and better driving. The ADAS modules 128 may be configured to alert the driver of the vehicle 10 of upcoming traffic conditions or disabled vehicles and/or to alert the vehicle 10 of a vehicle proximate to the vehicle 10 in order to avoid collisions and accidents. Further, the ADAS modules 128 may autonomously avoid collisions by implementing safeguards and taking over control of the vehicle 10, such as, by automatic lighting, initiating adaptive cruise control (e.g., via the VPC 102) and collision avoidance (e.g., by controlling a trajectory of the vehicle 10 or bringing the vehicle 10 to a complete stop either using the VPC 102 or directly using the brake controller 112). The PAC 124 may receive information, such as traffic characteristics, vehicle proximity information, disabled vehicle information, other suitable information, or a combination thereof, from the ADAS modules 128.

The PAC 124 may receive, at least, some of the route characteristics from the V2X module communication 130. The V2X communication module 130 is configured to communicate with other systems proximate or remotely located from the vehicle 10, as described, to obtain and share information, such as, traffic information, vehicle speed information, construction information, other information, or a combination thereof. The PAC 124 may receive other vehicle speed information, other vehicle location information, other traffic information, construction information, other suitable information, or a combination thereof, from the V2X communication module 130.

The PAC 124 may receive, at least, some of the route characteristics from the remote computing device 132. For example, the PAC 124 may receive further information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the PAC 124 may receive vehicle parameters from the remote computing device 132, such as, a make of the vehicle 10, model of the vehicle 10, propulsion configuration of the vehicle 10, manufacturer provided energy consumption efficiency of the vehicle 10, a weight of the vehicle 10, other vehicle parameters, or a combination thereof. In some embodiments, the PAC 124 may receive traffic signal location information, traffic stop sign location information, posted speed limit information, lane shift information, other route characteristics or information, or a combination thereof, from the remote computing device 132. The remote computing device 132 may include any suitable computing device or devices, such as a cloud computing device or system, a remotely located server or servers, a remotely or proximately located mobile computing device or application server that provides information to a mobile computing device, other suitable computing devices, or a combination thereof. The remote computing device 132 is remotely located from the vehicle 10, such as in a datacenter or other suitable location. In some embodiments, the remote computing device 132 may be located within the vehicle 10 (e.g., a mobile computing device used by the driver of the vehicle 10).

In some embodiments, the PAC 124 may receive traffic signal information, such as traffic signal phase and timing (SPaT) from a smart algorithm used by a traffic data provider. The SPaT information may indicate when traffic signals are changing and/or the timing of traffic signals.

The PAC 124 may receive route characteristics and/or vehicle parameters from the driver of the vehicle 10. For example, the driver may interact with an interface of the PAC 124, such as using the display 122 or using a mobile computing device, to provide vehicle parameters of the vehicle 10, such as, vehicle weight, vehicle make and model, vehicle age, vehicle maintenance information, vehicle identification number, a number of passengers, load information (e.g., an amount of luggage or other load information), other vehicle parameters, or a combination thereof. Additionally, or alternatively, the driver may provide route characteristics, such as a route map, route distance, other route characteristics, or a combination thereof, to the PAC 124. In some embodiments, the PAC 124 learns behavior of the driver of the vehicle 10. For example, the PAC 124 monitors the driver's vehicle speed relative to posted speed limits or whether the driver implements a vehicle speed recommendation, as will be described, provided by the PAC 124.

In some embodiments, the PAC 124 may learn traffic patterns for known routes traversed by the vehicle 10. For example, the PAC 124 may track traffic conditions while the vehicle 10 traverses one or more routes on a routine or regular basis. The PAC 124 may determine traffic patterns for the routes based on the monitored traffic conditions. In some embodiments, the PAC 124 receives traffic patterns for a route the vehicle 10 is traversing from the remote computing device 132, or from the mapping characteristics module based on the signals from the GPS antenna 126, as described It should be understood that the PAC 124 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the PAC 124 may be configured to learn any suitable characteristics or information described or not described herein.

Typically, vehicles, such as the vehicle 10, include a navigation system (e.g., integrated into the vehicle dash, an application on a mobile computing device, or a combination thereof), as described, that provides the driver of the vehicle 10 with the ability to select between route alternatives for a desired destination (e.g., a destination the driver of the vehicle 10 provides to the navigation system as an input). Such route alternatives are typically displayed with a travel time and/or a travel distance, such that, the driver of the vehicle 10 may select a route based on how long it will take to traverse the route, the total traversable distance of the route, or a combination of both. Additionally, or alternatively, the driver of the vehicle 10 may be able to provide preference information, such that the navigation system may provide route alternatives based on the preferences (e.g., to avoid toll roads, use highways where available, and the like).

However, such typical navigation systems do not allow the driver of the vehicle 10 to select a route based on energy consumption. Accordingly, in some embodiments, the PAC 124 may be configured to provide a plurality of routes for a destination (e.g., provided by the driver of the vehicle 10) that include energy consumption information for each route of the plurality of routes.

For example, the PAC 124 may receive a destination input from the driver of the vehicle 10. As described, the PAC 124 may be disposed within the vehicle 10, and accordingly, may receive inputs from an interface within the vehicle 10 (e.g., using the navigation system, the display 122, or another suitable interface). Additionally, or alternatively, the driver of the vehicle 10 may access an application on a mobile computing device to provide input information to the PAC 124 (e.g., the mobile computing device may communicate with the PAC 124, as described) and may receive output from the PAC 124 on the display 122, or other suitable location within the vehicle 10 and/or the mobile computing device. In some embodiments, the PAC 124 may be disposed on mobile computing device dedicated to the PAC 124, such that the driver of the vehicle 10 provides input information to the PAC 124 via an application on the mobile computing device and may receive output from the PAC 124 on the mobile computing device.

The PAC 124, as described, communicates with the mapping characteristics module and may provide the destination input to the mapping characteristics module. The mapping characteristics module may return a plurality of routes between a current location of the vehicle 10 (e.g., and/or the mobile computing device) and the destination. The plurality of routes may include a travel time and a travel distance for each route of the plurality of routes. In some embodiments, the PAC 124 may receive route information from the remote computing device 132, as described, and may generate the plurality of routes based on the route information.

The PAC 124 may receive vehicle parameters of the vehicle 10, as described. For example, the driver of the vehicle 10 may provide the vehicle parameters during a setup or installation of an application that interfaces with the PAC 124 (e.g., via the mobile computing device and/or the display 122 or other suitable interfaces within the vehicle 10). The PAC 124 may receive route characteristics (e.g., including road grades, traffic, speed limits, stop signs, traffic signals, other route characteristics, or a combination thereof), as described, for each of the plurality of routes. The PAC 124 is configured to generate an energy consumption profile for the vehicle 10, as described. For example, the energy consumption profile may be generated using the information described above and may indicate an optimum energy consumption of the vehicle 10 for various route characteristics, such as road grades, traffic, speed limits, stop signs, traffic signals, other route characteristics, or a combination thereof.

The PAC 124 may use the energy consumption profile for the vehicle 10 to generate an average energy consumption for each route of the plurality of routes. For example, the PAC 124 may apply the energy consumption profile to the particular route characteristics for each route of the plurality of routes to generate an average energy consumption for the respective routes.

Figure 3:
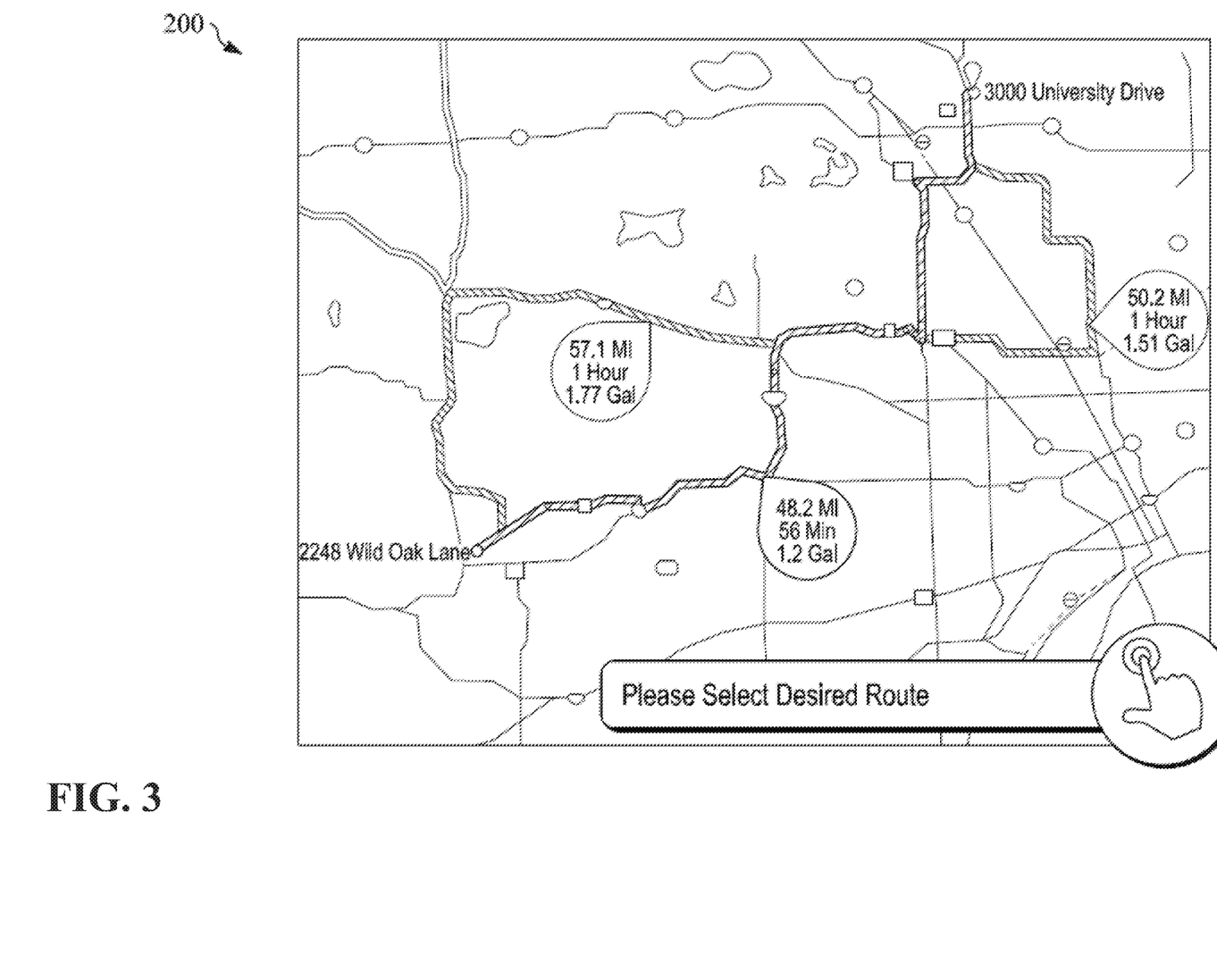
FIG. 3 generally illustrates a route selection interface according to the principles of the present disclosure.

The PAC 124 may output the plurality of routes, including a travel distance, a travel time, and a generated average energy consumption for each route of the plurality of routes. FIG. 3 generally illustrates a route selection interface 200 according to the principles of the present disclosure. The PAC 124 may output the plurality of routes to the route selection interface 200. The route selection interface 200 may be disposed on the display 122, the mobile computing device, or other suitable output device. While only the route selection interface 200 is generally illustrated, it should be understood that the route selection interface 200 is meant as an example interface and that the PAC 124 may output the plurality of routes to any suitable interface.

The driver of the vehicle 10 may select a route from the plurality of routes. The PAC 124 may receive the selected route. In some embodiments, the PAC 124 may generate navigation output and communicate the navigation output to the display 122 (e.g., or other suitable display device, as described). The navigation output may include a portion of the selected route (e.g., a portion of the selected route immediately ahead of the vehicle 10) and instructions for traversing the selected route. The PAC 124 may continue to adjust and/or update the navigation output as the vehicle 10 traverses the selected route (e.g., the PAC 124 may change the portion of the selected route and the instructions for traversing the selected route as the vehicle 10 traverses the selected route).

In some embodiments, the driver of the vehicle 10 may follow the instructions output by the PAC 124 in order to traverse the selected route with the vehicle 10. The PAC 124 may monitor route characteristics of the selected route as the vehicle 10 traverses the selected route. The PAC 124 may provide feedback to the driver of the vehicle 10 (e.g., using the display 122 or other suitable display devices, as described). The feedback may recommend an alternative route to the driver of the vehicle 10 if, for example, the route characteristics indicate that traffic has increased on the selected route, an accident occurred on the selected route, or other suitable changes to route characteristics of the selected route occurred. In some embodiments, the PAC 124 may provide recommendations to the driver and/or the VPC 102 (e.g., in the case of cruise control or adaptive cruise control being used to traverse the selected route) of the vehicle 10 to increase vehicle speed, decrease vehicle speed, allow the vehicle to coast, or other suitable feedback in order to achieve the average energy consumption associated with the selected route. In some embodiments, as described, the vehicle 10 may include an autonomous vehicle. The PAC 124 may cooperatively operate with the autonomous features of the vehicle 10 to traverse the selected route and/or provide the feedback, as described, while the vehicle 10 is traversing the selected route.

Figure 4:
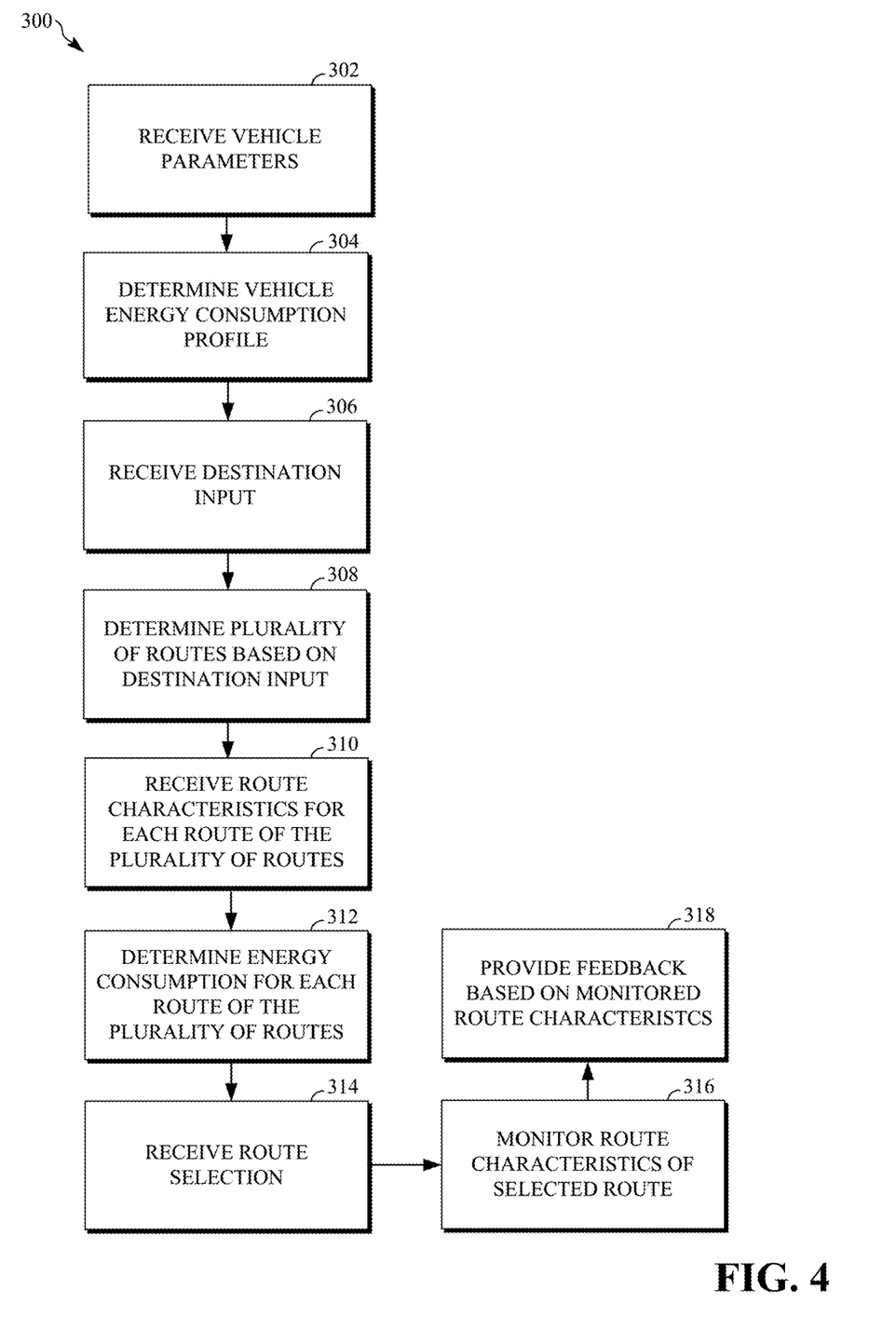
FIG. 4 is a flow diagram generally illustrating a route selection method according to the principles of the present disclosure.

FIG. 4 is a flow diagram generally illustrating a route selection method 300 according to the principles of the present disclosure. At 302, the method 300 receives vehicle parameters. As described, the PAC 124 may receive various vehicle parameters of the vehicle 10 from any of the components described herein and/or from the driver of the vehicle 10 (e.g., during a setup procedure). At 304, the method 300 determines a vehicle energy consumption profile. As described, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof). At 306, the method 300 receives destination input. As described, the PAC 124 may receive destination input information from the driver of the vehicle 10. At 308, the method 300 determines a plurality of routes based on the destination input. As described, the PAC 124 may generate and/or receive a plurality of alternative routes between the current location of the vehicle 10 (e.g., other specified location) and the destination input. The PAC 124 may receive the alternative routes from any of the components described herein. As described, the alternative routes include a travel distance and a travel time.

At 310, the method 300 receives route characteristics for each of the plurality of routes. As described, the PAC 124 receives various route characteristics and other information from any other components described herein for each of the routes of the plurality of routes. At 312, the method 300 determines an energy consumption for each route of the plurality of routes. As described, the PAC 124 determines an average energy consumption for each route of the plurality of routes. At 314, the method 300 receives a route selection. As described, the PAC 124 may provide the plurality of routes, including the drive time, the travel time, and the average energy consumption for each of the routes, to the driver of the vehicle 10 (e.g., using the display 122, a mobile computing device, or any suitable devices or components). The driver of the vehicle 10 selects a route from the plurality of routes. The PAC 124 receives the selected route. At 316, the method 300 monitors route characteristics of the selected route. As described, the PAC 124 monitors route characteristics of the selected route and may determine whether to adjust the selected route and/or provide information to the driver of the vehicle 10 based on the monitored route characteristics. At 318, the method 300 provides feedback based on the monitored route characteristics. As described, the PAC 124 may provide feedback to the driver of the vehicle 10 (e.g., using any of the devices or components described herein) indicating that route characteristics have changed or any other suitable feedback based on the monitored route characteristics.

In some embodiments, the PAC 124 is configured to determine a target torque split corresponding to a target vehicle speed, as described. The PAC 124 may cooperatively operate with the VPC 102 to provide arbitration of the target torque split (e.g., determined by the PAC 124) based on the target total torque demand determined by the VPC 102. In some embodiments, the PAC 124 may be an integrated component of the VPC 102, or may be an overlay component that communicates with or interfaces with the VPC 102 and/or other components of the vehicle 10. In some embodiments, the VPC 102 may include a cruise control mechanism, an adaptive cruise control mechanism, autonomous vehicle features, other suitable vehicle propulsion control features, or a combination thereof.

As described, the adaptive cruise control mechanism is configured to maintain the desired vehicle speed provided by the driver of the vehicle 10 using the HMI controls 104, and the adaptive cruise control mechanism is configured to maintain a safe distance between the vehicle 10 and a lead vehicle. Additionally, or alternatively, the VPC 102 may include or be a portion of an autonomous vehicle system that controls all or a portion of vehicle propulsion, steering, braking, safety, route management, other autonomous features, or a combination thereof of the vehicle 10. However, the VPC 102 does not take advantage of energy efficient vehicle propulsion control (e.g., such as a coasting to a stop in response to a determination that vehicle 10 is approaching a stop sign). Additionally, or alternatively, the VPC 102 cannot determine a torque split for achieving a desired vehicle speed based on route characteristics, as described.

The PAC 124 is configured to determine a target vehicle energy consumption profile, which may include one or more target vehicle speeds and one or more target torque splits, based on an energy consumption profile for the vehicle 10. The PAC 124 may determine a target torque demand based on profiles of a target vehicle speed and/or a target torque split.

In some embodiments, the PAC 124 determines the vehicle energy consumption profile using the information described herein. For example, the PAC 124 may determine the vehicle energy consumption profile using a vehicle weight, manufacturer provided vehicle energy efficiency, historical data corresponding to the vehicle 10 or similar vehicles indicating energy consumption of the vehicle 10 or similar vehicles while traversing portions of a particular route or specific road grades, other suitable route or road information, other suitable vehicle parameters, or a combination thereof. The vehicle energy consumption profile may indicate that the vehicle 10 consumes a specified amount of energy (e.g., within a tolerance range) while operating at a specific vehicle speed (within a tolerance) while traversing routes having particular road, traffic, and other conditions. For example, the energy consumption of the vehicle 10 may be greater when the vehicle 10 is on an incline and may be less when the vehicle 10 is coasting to a stop. In some embodiments, the PAC 124 receives or retrieves a vehicle energy consumption profile for the vehicle 10 determined remotely from the vehicle 10, such as by the remote computing device 132.

The PAC 124 is configured to use the vehicle energy consumption profile and various route characteristics to determine the profiles for the target vehicle speed and/or target torque split for a portion of a route being traversed by the vehicle 10. For example, the PAC 124 may determine that the vehicle 10 is approaching a particular variation in grade over the portion of the route being traversed by the vehicle 10 based on identified route characteristics of a portion of the route being traversed by the vehicle 10. In some embodiments, the route being traversed by the vehicle 10 may include the selected route, as described, selected by the driver of the vehicle 10 from the plurality of routes provided to the driver of the vehicle 10 by the PAC 124.

The PAC 124 uses the vehicle energy consumption profile to identify a vehicle speed (within a threshold range of the desired vehicle speed provided by the driver to the VPC 102) and/or a torque split having an optimum energy consumption for the grade variation of the portion of the route being traversed by the vehicle. In some embodiments, the PAC 124 may determine the vehicle speed and torque split using historical energy consumption for a known route, such as a route previously traversed by the vehicle 10 or similar vehicles. The PAC 124 determines a target torque demand from the identified vehicle speed and determines a target torque split from the target torque demand. It should be understood that the PAC 124 continuously monitors the various characteristics received, as described, and continues to generate profiles for target vehicle speeds and/or target torque splits, such that, the vehicle 10 maintains an optimum or improved energy consumption while maintaining driver and/or passenger comfort (e.g., by avoiding sudden, unnecessary changes in vehicle speed).

As described, the PAC 124 may control or interface with the VPC 102 in order to achieve the target torque split, which may result in optimum or improved energy consumption efficiency of the vehicle 10. In some embodiments, the PAC 124 may be in direct communication with the VPC 102 and the torque split controller 116 to provide target torque splits to the VPC 102 and/or the torque split controller 116, to achieve an optimum or improved energy consumption efficiency of the vehicle 10. For example, the VPC 102 may be configured to receive HMI signals (e.g., as described), to follow a lead vehicle based on information from the vehicle sensors 108 (e.g., as described), and to receive a recommended target vehicle speed signal from the PAC 124. The VPC 102 may determine whether to apply the target vehicle speed indicated by the recommended target vehicle speed signal, for example, based on the driver input, the detection of a lead vehicle, and/or the safety controls of the VPC 102.

The VPC 102 determines a total torque demand based on the desired vehicle speed, as described. The PAC 124 may determine a torque split based on the total torque demand and/or other information, such as, traction control information, or other suitable vehicle information. As described, the torque split indicates a portion of the total torque demand to be demanded of the first propulsion unit 120-1 and a portion of the total torque demand to be demanded of the second propulsion unit 120-2.

In some embodiments, the PAC 124 receives (e.g., or intercepts) the desired vehicle speed and total torque demand (e.g., determined by the VPC 102). As described, the PAC 124 determines a profile for the target vehicle speed based on, at least, the vehicle parameters and the route characteristics. The PAC 124 determines a target torque demand for achieving the target vehicle speed. The PAC 124 may then generate a target torque split based on the target torque demand, the route characteristics, an available torque from the first propulsion unit 120-1, an available torque from the second propulsion unit 120-2, or a combination thereof.

In some embodiments, the PAC 124 may communicate the target torque demand and the target torque split to the torque controller 110 and the torque split controller 116, respectively. The torque controller 110 and the torque split controller 116 may communicate the target torque demand and the target torque split, respectively, to the propulsion system 120. The propulsion system 120 may apply the target torque demand, according to the target torque split, to the first propulsion unit 120-1 and the second propulsion unit 120-2.

In some embodiments, feedback control of the vehicle 10 is handled by the VPC 102. Accordingly, the VPC 102 determines the total torque demand, as described, and communicates the total torque demand to the torque controller 110. The PAC 124 determines, as described, the target torque split and communicates the target torque split to the torque split controller 116. The torque controller 110 and the torque split controller 116 continue as described. In order for the VPC 102 to determine, and deliver, the total torque demand and the PAC 124 to determine the target torque split, the PAC 124 may provide torque split arbitration, as described. This may result in a scaling of the target torque split determined by the PAC 124, in such a way that the closest to optimal torque split is achieved by the first propulsion unit 120-1 and the second propulsion unit 120-2, while the VPC 102 maintains the total torque demand.

In some embodiments, in order to provide torque split arbitration, the PAC 124 receives the total torque demand from the VPC 102, as described. As described, the PAC 124 determines a target vehicle speed, a target torque demand, and a target torque split (e.g., based on the vehicle parameters and the route characteristics). The target torque split includes a first portion that corresponds to a portion of the target torque demand to be provided to the first propulsion unit 120-1 and a second portion that corresponds to a portion of the target toque demand to be provided to the second propulsion unit 120-2.

The PAC 124 may then determine a torque demand percentage that includes a ratio of the total torque demand and the target torque demand. The PAC 124 determines a product of the torque demand percentage and the first portion of the target torque split (e.g., the portion of the target torque demand to be provided to the first propulsion unit 120-1). The PAC 124 may generate a first output torque demand that corresponds to the product of the torque demand percentage and the first portion of the target torque split.

The PAC 124 determines the difference between the total torque demand and the first output torque demand. The PAC 124 generates a second output torque demand that corresponds to the difference between the total torque demand and the first output torque demand.

The PAC 124 determines a scaled target torque split that comprises of the first output torque demand and the second output torque demand. The VPC 102 communicates the total torque demand to the torque controller 110. The PAC 124 communicates the scaled target torque split to the torque split controller 116. The torque controller 110 and the torque split controller 116 communicate the total torque demand and the scaled target torque split, respectively, to the propulsion system 120. The propulsion system 120 applies the total torque demand to the first propulsion unit 120-1 and the second propulsion unit 120-2, according to the scaled target torque split. For example, the first propulsion unit 120-1 may provide the first output torque demand and the second propulsion unit 120-2 may provide the second output torque demand.

In some embodiments, the first propulsion unit 120-1 (e.g., an electric motor) may not be able to supply the first output torque demand. If the first propulsion unit 120-1 cannot supply the first output torque demand, the torque split controller 116 and/or the PAC 124 may instruct the first propulsion unit 120-1 to supply a maximum amount of torque. The torque split controller 116 and/or the PAC 124 may then instruct the second propulsion unit 120-2 to supply the difference between the total torque demand and the amount of torque supplied by the first propulsion unit 120-1.

In some embodiments, the first propulsion unit 120-1 is controlled (e.g., using the scaled target torque split) to assist the second propulsion unit 120-2, based on a determination that the second propulsion unit 120-2 can generate more torque than the first propulsion unit 120-1. However, it should be understood that the first propulsion unit 120-1 may be capable of generating more torque than the second propulsion unit 120-2 and, accordingly, the second propulsion unit 120-2 may assist the first propulsion unit 120-1. Additionally, or alternatively, the first propulsion unit 120-1 and the second propulsion unit 120-2 may be capable of generating the same amount of torque. Accordingly, either may be selected to assist the other.

Figure 5:
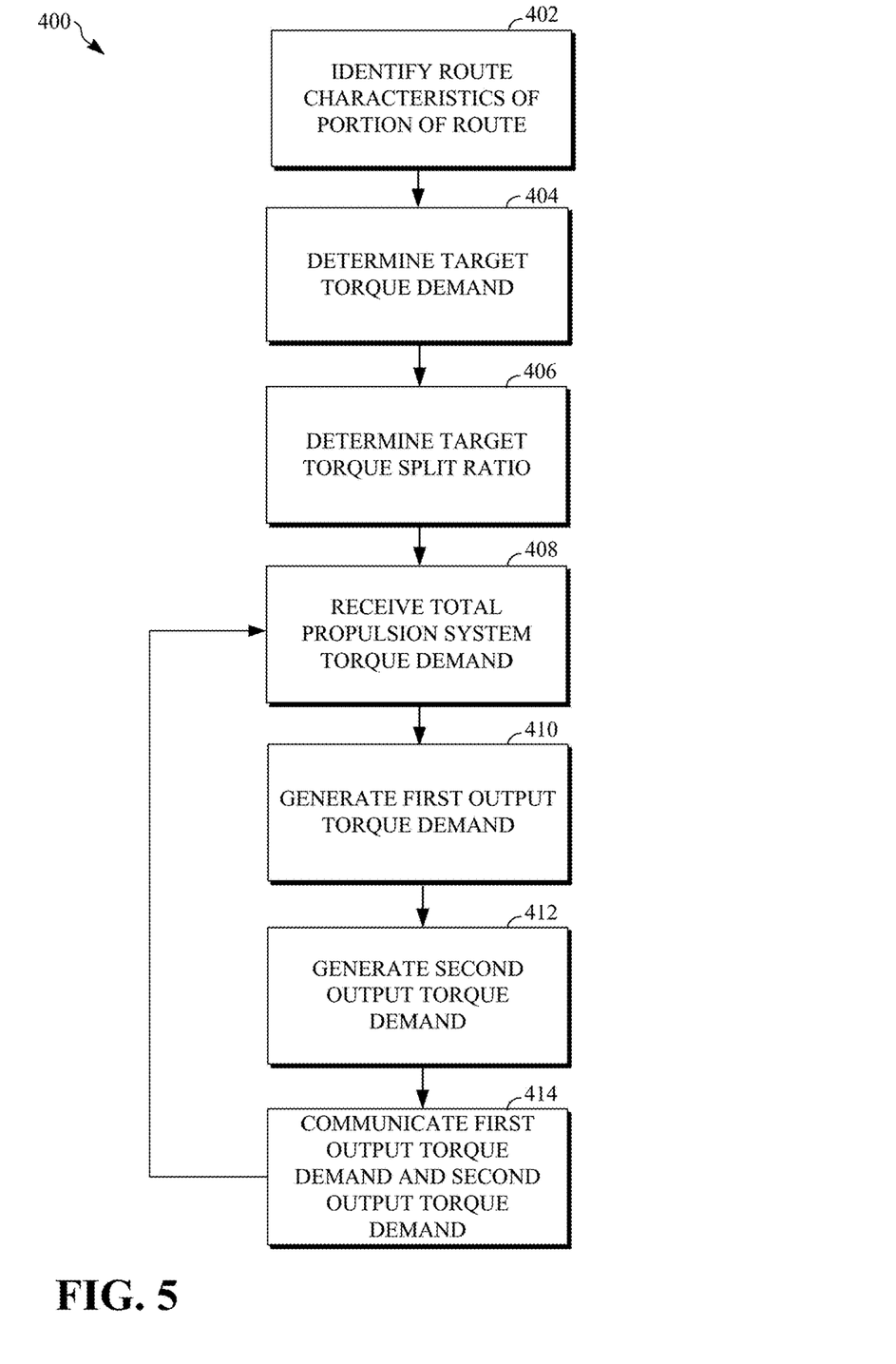
FIG. 5 is a flow diagram generally illustrating a torque split arbitration method according to the principles of the present disclosure.

FIG. 5 is a flow diagram generally illustrating a torque split arbitration method 400 according to the principles of the present disclosure. At 402, the method 400 identifies route characteristics of a portion of a route. As described, the PAC 124 may identify and/or receive route characteristics of a route being traversed by the vehicle 10. The PAC 124 may identify route characteristics corresponding to a portion of the route being traversed by the vehicle 10 that the vehicle 10 is approaching (e.g., a change in road grade, an upcoming traffic signal, or other suitable route characteristics, described herein). In some embodiments, the route being traversed by the vehicle 10 may include the selected route, as described. At 404, the method 400 determines a target torque demand. As described, the VPC 102 may determine a total torque demand based on a desired vehicle speed. The PAC 124 may determine a target torque demand and a torque split corresponding to a target vehicle speed determined based on the energy consumption profile of the vehicle 10 and/or the route characteristics.

At 406, the method 400 determines a target torque split. As described, the PAC 124 determines a target torque split based on the target torque demand. At 408, the method 400 receives a total propulsion system torque demand. As described, the VPC 102 generates a total torque demand (e.g., a total propulsion system torque demand). The PAC 124 receives the total torque demand. At 410, the method 400 determines a first output torque demand. As described, the PAC 124 determines a first output torque demand that corresponds to the product of the first portion of the target torque demand (e.g., the portion of the target demand to be provided by the first propulsion unit 120-1 as indicated by the target torque split) and the ratio of the total propulsion system torque demand and the target torque demand. At 412, the method 400 determines a second output torque demand. As described, the PAC 124 determines a second output torque demand corresponding to the difference between the total propulsion system torque demand (e.g., the total torque demand generated by the VPC 102) and the first output torque demand.

At 414, the method 400 communicates the first output torque demand and the second output torque demand. As described, the PAC 124 determines a scaled target torque split that comprises the first output torque demand and the second output torque demand. The VPC 102 communicates the total torque demand to the torque controller 110. The PAC 124 communicates the scaled target torque split to the torque split controller 116. The torque controller 110 and the torque split controller 116 communicate the total torque demand and the scaled target torque split, respectively, to the propulsion system 120. The propulsion system 120 applies the total torque demand to the first propulsion unit 120-1 and the second propulsion unit 120-2, according to the scaled target torque split. For example, the first propulsion unit 120-1 may provide the first output torque demand and the second propulsion unit 120-2 may provide the second output torque demand. The method 400 continues at 408.

In some embodiments, the PAC 124 and/or the VPC 102 may perform the methods described herein, such as, the method 300 and the method 400. However, the methods described herein as performed by the PAC 124 and/or the VPC 102 are not meant to be limiting, and any type of software executed on a controller can perform the methods described herein without departing from the scope of this disclosure. For example, a controller, such as a processor executing software within a computing device onboard the vehicle 10, can perform the methods described herein.

In some embodiments, a method for torque split arbitration in a vehicle includes identifying at least one route characteristic of a portion of a route being traversed by the vehicle. The method further include determining a target torque demand and a target torque split based on the at least one route characteristic and a vehicle energy consumption profile. The target torque split indicates a first portion of the target torque demand to be provided by a first propulsion unit and a second portion of the target torque demand to be provided by a second propulsion unit. The method further includes receiving a total propulsion system torque demand from a vehicle propulsion controller of the vehicle. The method further includes generating a first output torque demand that corresponds to a product of the first portion of the target torque demand to be provided by the first propulsion unit and a ratio of the total propulsion system torque demand and the target torque demand. The method further includes generating a second output torque demand that corresponds to the difference of the total propulsion system torque demand and the first output torque demand. The method further includes communicating the first output torque demand and the second output torque demand to a torque split controller of the vehicle.

In some embodiments, the at least one route characteristic includes at least one of a traffic condition, a traffic signal, and a road grade. In some embodiments, the first propulsion unit includes one of an internal combustion engine and at least one electric motor and the second propulsion unit includes the other of the internal combustion engine and the at least one d electric motor. In some embodiments, the vehicle propulsion controller includes an adaptive cruise control mechanism. In some embodiments, the vehicle energy consumption profile is determined based on at least one vehicle characteristic that contributes to vehicle energy consumption. In some embodiments, the route being traversed by the vehicle includes a route selected by a driver of the vehicle from a plurality of routes provided to the driver, and wherein the plurality of routes is provided to the driver with information indicating an energy consumption value for each route of the plurality of routes.

In some embodiments, an apparatus for torque split arbitration in a vehicle includes a memory and a processor. The memory includes instructions executable by the processor to: identify at least one route characteristic of a portion of a route being traversed by the vehicle; determine a target torque demand and a target torque split based on the at least one route characteristic and a vehicle energy consumption profile, wherein the target torque split indicates a first portion of the target torque demand to be provided by a first propulsion unit and a second portion of the target torque demand to be provided by a second propulsion unit; receive a total propulsion system torque demand from a vehicle propulsion controller of the vehicle; generate a first output torque demand that corresponds to a product of the first portion of the target torque demand to be provided by the first propulsion unit and a ratio of the total propulsion system torque demand and the target torque demand; generating a second output torque demand that corresponds to the difference of the total propulsion system torque demand and the first output torque demand; and communicating the first output torque demand and the second output torque demand to a torque split controller of the vehicle.

In some embodiments, the at least one route characteristic includes at least one of a traffic condition, a traffic signal, and a road grade. In some embodiments, the first propulsion unit includes one of an internal combustion engine and at least one electric motor and the second propulsion unit includes the other of the internal combustion engine and the at least one electric motor. In some embodiments, the vehicle includes an autonomous vehicle. In some embodiments, the vehicle energy consumption profile is determined based on at least one vehicle characteristic that contributes to vehicle energy consumption. In some embodiments, the route being traversed by the vehicle includes a route selected by a driver of the vehicle from a plurality of routes provided to the driver, and wherein the plurality of routes is provided to the driver with information indicating an energy consumption value for each route of the plurality of routes.

In some embodiments, a non-transitory computer-readable storage medium includes executable instructions that, when executed by a processor, facilitate performance of operations, comprising: identifying at least one route characteristic of a portion of a route being traversed by a vehicle; determining a target torque demand based and a target torque split on the at least one route characteristic and a vehicle energy consumption profile, wherein the target torque split indicates a first portion of the target torque demand to be provided by an electric motor and a second portion of the target torque demand to be provided by an internal combustion engine; receiving a total propulsion system torque demand from a vehicle propulsion controller of the vehicle; generating a first output torque demand that corresponds to a product of the first portion of the target torque demand to be provided by the electric motor and a ratio of the total propulsion system torque demand and the target torque demand; generating a second output torque demand that corresponds to the difference of the total propulsion system torque demand and the first output torque demand; and communicating the first output torque demand and the second output torque demand to a torque split controller of the vehicle.

In some embodiments, the first output torque demand indicates a torque demand to be provided to the electric motor by the torque split controller of the vehicle. In some embodiments, the second output torque demand indicates a torque demand to be provided to the internal combustion engine by the torque split controller of the vehicle. In some embodiments, the route being traversed by the vehicle includes a route selected by a driver of the vehicle from a plurality of routes provided to the driver, and wherein the plurality of routes is provided to the driver with information indicating an energy consumption value for each route of the plurality of routes. In some embodiments, the at least one route characteristic includes at least one of a traffic condition, a traffic signal, and a road grade. In some embodiments, the vehicle includes an autonomous vehicle. In some embodiments, the vehicle energy consumption profile is determined based on at least one vehicle characteristic that contributes to vehicle energy consumption. In some embodiments, the vehicle propulsion controller includes an adaptive cruise control mechanism.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for torque split arbitration in a vehicle, the method comprising:
   identifying at least one route characteristic of a portion of a route being traversed by the vehicle;
   determining a vehicle energy consumption profile for the vehicle based on at least:
      historical data indicating energy consumption of the vehicle for at least a portion of a route previously traversed by the vehicle and having at least one route characteristic corresponding to the at least one route characteristic of the portion of the route being traversed by the vehicle; and
      historical data associated with at least one other vehicle for at least a portion of a route previously traversed by the at least one other vehicle having at least one route characteristic corresponding to the at least one route characteristic of the route being traversed by the vehicle;
   determining a target torque demand and a target torque split based on the at least one route characteristic and the vehicle energy consumption profile, wherein the target torque split indicates a first portion of the target torque demand to be provided by a first propulsion unit and a second portion of the target torque demand to be provided by a second propulsion unit;
   receiving a total propulsion system torque demand from a vehicle propulsion controller of the vehicle;
   generating a first output torque demand that corresponds to a product of the first portion of the target torque demand to be provided by the first propulsion unit and a ratio of the total propulsion system torque demand and the target torque demand;
   generating a second output torque demand that corresponds to the difference of the total propulsion system torque demand and the first output torque demand; and
   communicating the first output torque demand and the second output torque demand to a torque split controller of the vehicle.

2. The method of claim 1, wherein the at least one route characteristic includes at least one of a traffic condition, a traffic signal, and a road grade.

3. The method of claim 1, wherein the first propulsion unit includes one of an internal combustion engine and at least one electric motor, and the second propulsion unit includes the other of the internal combustion engine and the at least one electric motor.

4. The method of claim 1, wherein the vehicle propulsion controller includes an adaptive cruise control mechanism.

5. The method of claim 1, wherein the vehicle energy consumption profile is determined further based on at least one vehicle characteristic that contributes to vehicle energy consumption.

6. The method of claim 1, wherein the route being traversed by the vehicle includes a route selected by a driver of the vehicle from a plurality of routes provided to the driver, and wherein the plurality of routes is provided to the driver with information indicating an energy consumption value for each route of the plurality of routes.

7. An apparatus for torque split arbitration in a vehicle comprising:
   a memory; and
   a processor, wherein the memory includes instructions executable by the processor to:
   identify at least one route characteristic of a portion of a route being traversed by the vehicle;
   determine a vehicle energy consumption profile for the vehicle based on at least:
      historical data indicating energy consumption of the vehicle for at least a portion of a route previously traversed by the vehicle having at least one route characteristic corresponding to the at least one route characteristic of the portion of the route being traversed by the vehicle; and
      historical data associated with at least one other vehicle for at least a portion of a route previously traversed by the at least one other vehicle having at least one route characteristic corresponding to the at least one route characteristic of the route being traversed by the vehicle;
   determine a target torque demand and a target torque split based on the at least one route characteristic and the vehicle energy consumption profile, wherein the target torque split indicates a first portion of the target torque demand to be provided by a first propulsion unit and a second portion of the target torque demand to be provided by a second propulsion unit;
   receive a total propulsion system torque demand from a vehicle propulsion controller of the vehicle;
   generate a first output torque demand that corresponds to a product of the first portion of the target torque demand to be provided to by first propulsion unit and a ratio of the total propulsion system torque demand and the target torque demand;
   generating a second output torque demand that corresponds to the difference of the total propulsion system torque demand and the first output torque demand; and
   communicating the first output torque demand and the second output torque demand to a torque split controller of the vehicle.

8. The apparatus of claim 7, wherein the at least one route characteristic includes at least one of a traffic condition, a traffic signal, and a road grade.

9. The apparatus of claim 7, wherein the first propulsion unit includes one of an internal combustion engine and at least one electric motor, and the second propulsion unit includes the other of the internal combustion engine and the at least one electric motor.

10. The apparatus of claim 7, wherein the vehicle includes an autonomous vehicle.

11. The apparatus of claim 7, wherein the vehicle energy consumption profile is further determined based on at least one vehicle characteristic that contributes to vehicle energy consumption.

12. The apparatus of claim 7, wherein the route being traversed by the vehicle includes a route selected by a driver of the vehicle from a plurality of routes provided to the driver, and wherein the plurality of routes is provided to the driver with information indicating an energy consumption value for each route of the plurality of routes.

13. A non-transitory computer-readable storage medium, comprising executable instructions that, when executed by a processor, facilitate performance of operations, comprising:
  identifying at least one route characteristic of a portion of a route being traversed by a vehicle;
  determining a vehicle energy consumption profile for the vehicle based on at least:
    historical data indicating energy consumption of the vehicle for at least a portion of a route previously traversed by the vehicle having at least one route characteristic corresponding to the at least one route characteristic of the portion of the route being traversed by the vehicle; and
    historical data associated with at least one other vehicle for at least a portion of a route previously traversed by the at least one other vehicle having at least one route characteristic corresponding to the at least one route characteristic of the route being traversed by the vehicle;
  determining a target torque demand and a target torque split based on the at least one route characteristic and the vehicle energy consumption profile, wherein the target torque split indicates a first portion of the target torque demand to be provided by an electric motor and a second portion of the target torque demand to be provided by an internal combustion engine;
  receiving a total propulsion system torque demand from a vehicle propulsion controller of the vehicle;
  generating a first output torque demand that corresponds to a product of the first portion of the target torque demand to be provided by the electric motor and a ratio of the total propulsion system torque demand and the target torque demand;
  generating a second output torque demand that corresponds to the difference of the total propulsion system torque demand and the first output torque demand; and
  communicating the first output torque demand and the second output torque demand to a torque split controller of the vehicle.

14. The non-transitory computer-readable storage medium of claim 13, wherein the first output torque demand indicates a torque demand to be provided to the electric motor by the torque split controller of the vehicle.

15. The non-transitory computer-readable storage medium of claim 13, wherein the second output torque demand indicates a torque demand to be provided to the internal combustion engine by the torque split controller of the vehicle.

16. The non-transitory computer-readable storage medium of claim 13, wherein the route being traversed by the vehicle includes a route selected by a driver of the vehicle from a plurality of routes provided to the driver, and wherein the plurality of routes is provided to the driver with information indicating an energy consumption value for each route of the plurality of routes.

17. The non-transitory computer-readable storage medium of claim 13, wherein the at least one route characteristic includes at least one of a traffic condition, a traffic signal, and a road grade.

18. The non-transitory computer-readable storage medium of claim 13, wherein the vehicle includes an autonomous vehicle.

19. The non-transitory computer-readable storage medium of claim 13, wherein the vehicle energy consumption profile is further determined based on at least one vehicle characteristic that contributes to vehicle energy consumption.

20. The non-transitory computer-readable storage medium of claim 13, wherein the vehicle propulsion controller includes an adaptive cruise control mechanism.

* * * * *